United States Patent [19]
Beakes et al.

[11] Patent Number: 5,784,771
[45] Date of Patent: Jul. 28, 1998

[54] STATOR MANUFACTURING METHOD AND APPARATUS

[75] Inventors: John M. Beakes; Howard S. Hunter, both of Fairborn, Ohio

[73] Assignee: Globe Products Inc., Huber Heights, Ohio

[21] Appl. No.: 597,444

[22] Filed: Feb. 2, 1996

[51] Int. Cl.⁶ .................................................. H02K 15/00
[52] U.S. Cl. ............................. 29/596; 29/735; 29/863; 29/597; 29/566.1
[58] Field of Search .................... 242/432.4, 432.6; 29/564.5, 566.1, 596, 597, 735, 736, 732

[56] References Cited

U.S. PATENT DOCUMENTS

| | | | |
|---|---|---|---|
| 5,186,405 | 2/1993 | Beakes et al. | 242/432.4 |
| 5,214,838 | 6/1993 | Beakes et al. | 29/596 |
| 5,370,324 | 12/1994 | Beakes et al. | 242/432.4 |
| 5,651,177 | 7/1997 | Newman | 29/596 |

*Primary Examiner*—W. Donald Bray
*Attorney, Agent, or Firm*—Roger S. Dybvig

[57] ABSTRACT

Finish leads of coils wound onto stator cores without terminal boards are automatically secured before the stator is removed from the winding apparatus. Tooling is provided that is moved into position adjacent the stator at a lead tuck station to cooperate with a robot end effector to tuck the finish leads between their respective coils and the portion of the stator core adjacent thereto. Because the finish leads are so tucked, the coils do not have a tendency to despool when removed from the winding apparatus, which permits the use of an automated load/unload mechanism.

7 Claims, 2 Drawing Sheets

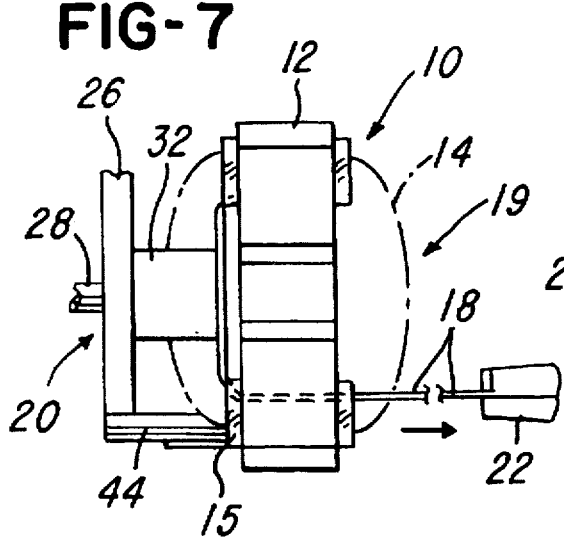
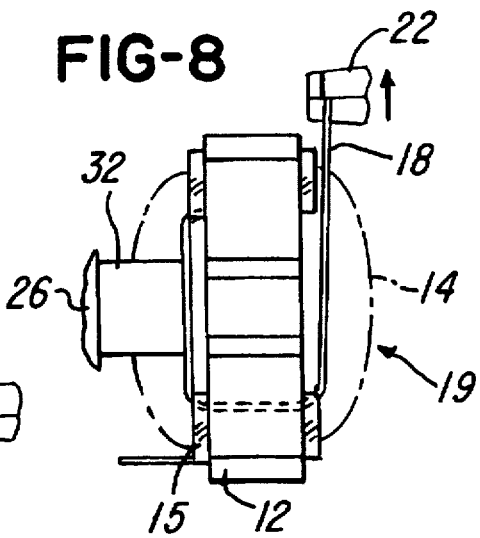
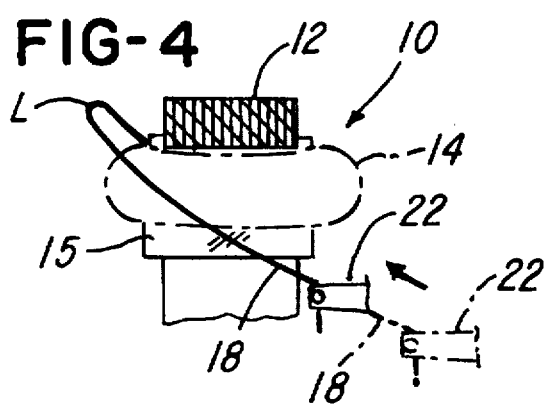
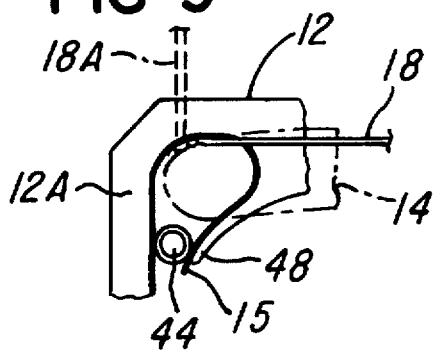
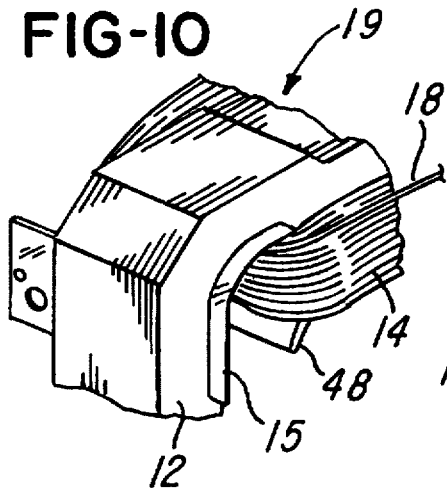
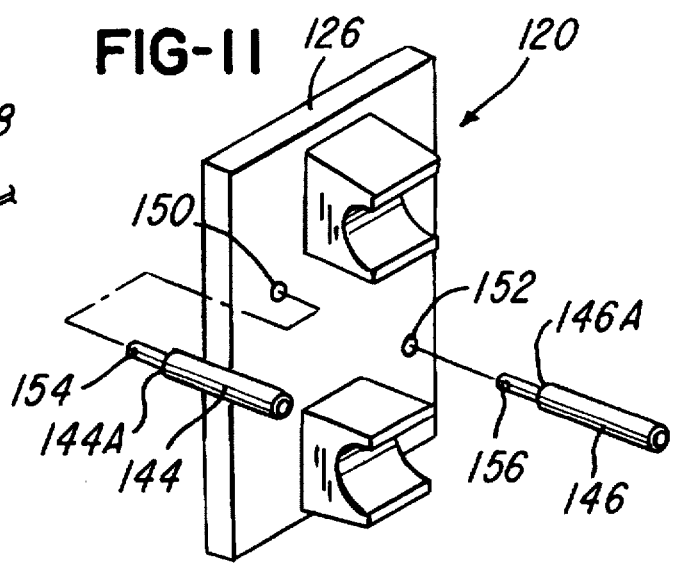

STATOR MANUFACTURING METHOD AND APPARATUS

FIELD OF THE INVENTION

This invention relates to a method and an apparatus for manufacturing electric motor stators. More particularly, this invention relates to a method and an apparatus for manufacturing electric motor stators that do not include a terminal board mounted to an end face thereof.

BACKGROUND OF THE INVENTION

Many electric motor stators are configured to include a nonconductive terminal board mounted to an end face of the stator core, which terminal board carries electrically conductive terminal members to which start and finish leads of the electric field coils wound onto the core are attached. Such stators are particularly suited for fully automated production because the electric field coils may be machine wound onto such stator cores and the start and finish leads of each coil may be at least temporarily secured to the terminal members before the wound stator is removed from the winding machine by an automated load/unload mechanism. The coils will not unwind or despool upon removal of the stator from the machine because the finish leads are each secured to a terminal member. The start leads, as is well known, are each trapped by their respective coil turns in addition to being connected to a terminal member.

In other stator configurations, no terminal board is mounted on the stator core. Thus, no terminal members are provided to which the coil leads can be connected before removal of the stator from the winding machine. "Boardless" stators have not been particularly suited for fully automated manufacturing because the coil leads, and in particular the finish leads, are not secured before the wound stators are removed from a winding machine. Therefore, the coils tend to despool after a wound stator is removed from the manufacturing apparatus. To prevent this despooling, the current practice is to machine wind the coils and to then remove the wound stators from the machine manually. The worker who removes the wound stator secures the free finish leads by taping the finish leads to their respective coils. However, some despooling may still occur. Therefore, before securing the finish leads, the worker must ensure that any coil turns that have despooled are reformed. As is evident, this procedure significantly increases the time needed to manufacture the stator.

The above-described despooling problem also arises in the manufacture of stators having terminal boards if the stators are manufactured by a process wherein the finish leads are not automatically connected to the terminals on the terminal board.

SUMMARY OF THE INVENTION

It is an object of this invention to provide a method and an apparatus for manufacturing stators whereby the wound stators are suitable for unloading from the apparatus using an automated load/unload mechanism without the stator coils despooling.

A related object is to provide a method and an apparatus whereby field coil finish leads of stators are automatically secured to the stator before the wound stator is removed from the winding apparatus. A more particular object is to provide a method and an apparatus for manufacturing stators whereby the coil finish leads are tucked and retained between their respective coils and the portion of the stator core adjacent the coils before the wound stator is removed from the manufacturing apparatus.

Still another object of this invention is to provide such a method and apparatus wherein the tooling used to facilitate the finish lead tucking is useful with several different stator and stator coil configurations.

In accordance with this invention, field coils are wound onto the stator core in a conventional manner, and the start and finish leads of each coil are inserted in a known manner into temporary wire clamps, which are fixed relative to the stator. The stator and the temporary wire clamps are then moved to a lead tuck station at which each of the finish leads is manipulated by a robot end effector to tuck the finish lead between its coil and the cell paper (or other insulator) covering the portion of the stator core adjacent thereto.

To accomplish the finish tucking, wire-guide tooling located behind the stator is movable to a position adjacent the rear of a wound stator at the lead tuck station. The wire-guide tooling includes upper and lower wire-guiding shoes and respectively associated upper and lower wire-retaining pins. The upper and lower wire-guiding shoes each have C-shaped recesses that receive the upper and lower coil end turns, respectively, and sloping surfaces that guide the finish leads as will be described below. The upper wire-retaining pin is located within the stator bore when the wire-guide tooling is adjacent the stator and occupies the space between stator frame and the upper stator pole tip adjacent the upper finish lead to prevent the upper finish lead from passing below the pole tip. The lower wire-retaining pin is located similarly with respect to a lower pole tip and the lower finish lead.

Here, it should be noted that the terms "upper" and "lower" are used herein in a relative, rather than an absolute sense.

After the tooling is advanced toward the rear of the stator, the robot end effector is moved to grip the upper coil finish lead to remove it from its temporary clamp, which may first be opened. Once the upper finish lead is removed from the clamp, the upper finish lead is manipulated by the robot end effector so that it extends downwardly from the rear of the coil near to or across the upper wire-retaining pin. Thereafter, the wire-guide tooling is retracted away from the rear of the stator, and the end effector manipulates the finish lead so that an upwardly-extending wire loop or slack condition is created in the last wound coil end turn. The wire-guide tooling is again advanced toward the rear of the stator, which places the upper wire-guiding shoe between the wire loop and the remainder of the upper coil. The slack wire may then be pulled tight by the robot end effector, which draws the slack wire against the downwardly sloping upper surface of the upper wire-guiding shoe. As the slack in the wire is removed, the wire is cammed by the wire-guiding shoe to position the last wound coil end turn atop the upper coil against the cell paper covering the inwardly-facing surfaces of the stator core. Preferably, the finish lead is tucked between the rear, finish side corner of the coil and the cell paper adjacent thereto by this action, but such tucking is not critical and need not be ensured. The robot end effector is further manipulated to positively insert or tuck the finish lead between the corresponding front, finish side corner of the coil and the cell paper (or other insulator) covering the coil.

The lower coil finish lead is tucked by use of the wire-guide tooling and the robot end effector in a similar manner. After both lead tuck operations have been performed, the start lead for each coil, as well as any intermediate coil taps that have been drawn, may be removed from their respective temporary wire clamps. Thereafter, the wound stator may be removed from the winding machine by an automated load/unload mechanism without the risk of the field coils despooling.

Preferably, the wire-guide tooling is constructed such that a single tooling piece may be used with a variety of wire sizes and a variety of numbers of wire turns per coil. Thus, the wire-guide tooling need not be replaced when switching among the manufacturing of stators with different specifications.

Other objects and advantages will become apparent in view of the following description and the accompanying drawings.

BRIEF DESCRIPTION OF THE DRAWINGS

FIG. 2 illustrates a later stage in the manufacturing process than FIG. 1.

FIG. 4 is a fragmentary, vertical section view similar to FIG. 2 but showing still a later stage in the manufacturing process.

FIGS. 7 and 8 are top plan views similar to FIG. 5 but showing still later stages in the manufacturing process.

FIG. 9 is a fragmentary end view similar to FIG. 3, but showing, in broken lines, the same stage in the manufacturing process as in FIG. 7 and showing in full lines the stage of the manufacturing process shown in FIG. 8.

FIG. 10 is a fragmentary perspective view showing the stator at the same stage in the manufacturing process shown in FIG. 8.

FIG. 11 is partly exploded, perspective view of second embodiment of the wire-guide tooling of FIG. 1.

DETAILED DESCRIPTION

Figure 1:
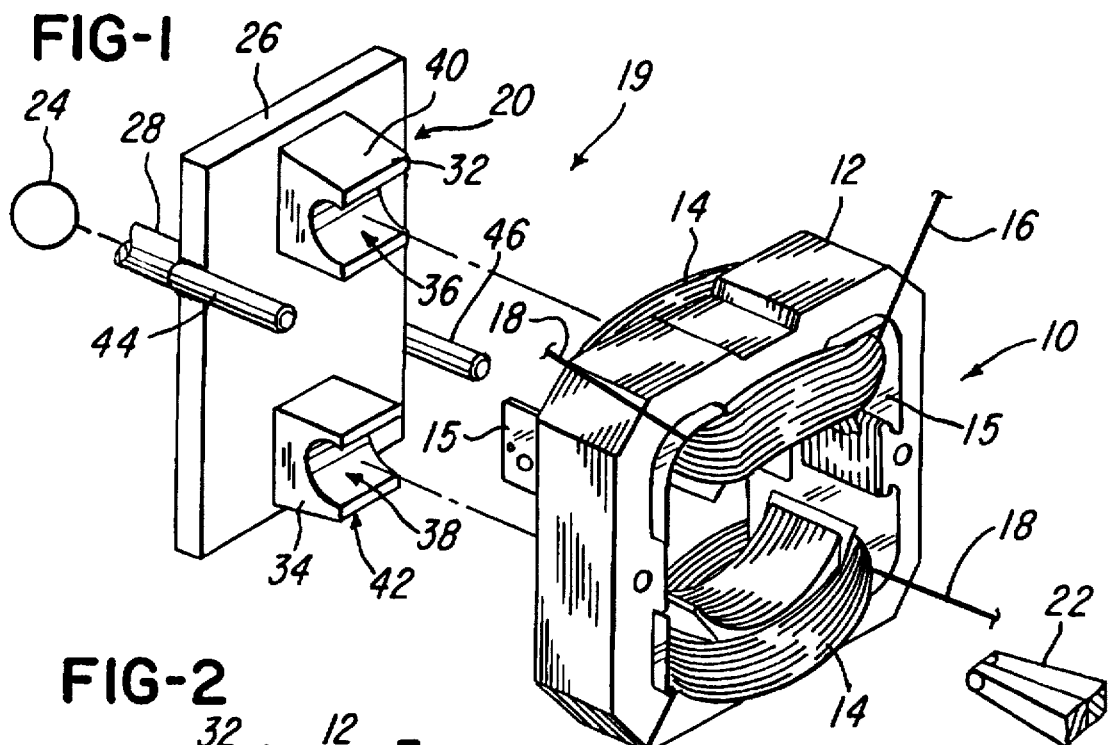
FIG. 1 is a fragmentary, partly diagrammatic front perspective view of apparatus in accordance with this invention showing wire-guide tooling in accordance with this invention and a stator with which the invention may be used.

With reference to FIG. 1, this invention is illustrated in connection with the manufacture of stator, generally designated 10, having a stator core 12. Field coils 14 formed from magnet wire drawn from a source of wire under tension are wound onto the core 12 in a conventional manner, such as by a winding machine (not shown) which has an reciprocating and oscillating ram. As is conventional, insulating cell paper 15 covers the inner surfaces of the stator core 12, although other insulating material may be used.

Preferably, the stator 10 is manufactured using a multi-function machine having a rotatable turret (not shown) that moves a stator 10 from one manufacturing station to another provided at circumferentially-spaced locations around the turret. Such machines are termed "turret winding machines" and typically include a winding station including the aforementioned winding machine, a terminal connect station, and a load/unload station. Examples of such a turret winding machines are illustrated in U.S. Pat. Nos. 5,186,406 and 5,370,324 to John M. Beakes et al., the disclosures of which are hereby incorporated herein by reference. (A conveyor track arrangement, as illustrated and described in U.S. Pat. No. 5,090,108, to Alvin C. Banner et al. which is also incorporated herein by reference, may be used instead of the turret winding machine.)

The turret (not shown) typically carries four stator clamp mechanisms (not shown) at ninety degree spaced locations around periphery of the turret, although another number of clamp mechanisms may be provided. The stator clamp mechanisms hold the stators with their longitudinal axes horizonal at each station, and a plurality of temporary wire clamps (not shown) are located in fixed relation thereto. As is well known, coil start leads 16 and finish leads 18 of each coil 14 are temporarily placed in temporary clamps at the winding station before the finish leads are severed from the wire source. In addition, any intermediate coil taps that have been pulled are also inserted into temporary clamps. The start and finish leads 16 and 18, as well as any intermediate taps, may be inserted into the wire clamps by tamping mechanisms as illustrated in commonly assigned, copending U.S. Patent application Ser. No. 08/425,866, filed Nov. 11, 1997, now U.S. Pat. No. 5,685,061.

The stators 10 manufactured in accordance with this invention may not include terminal boards and terminal members carried thereby, and may therefore be termed "boardless" stators. However, this invention is also useful in with stators having terminals if the leads are not connected to the terminal members, for whatever reason. Therefore, a turret winding machine adapted to manufacture the stators 10 need not include a terminal connect station, as no terminal connections are made. However, the terminal connect station is replaced at the same location by a lead tuck station in accordance with this invention. After the coil finish leads 18 are cut from the source of wire, the turret (not shown) is rotated or indexed to locate the stator 10 at the lead tuck station designated 19, which is illustrated in FIG. 1. At the lead tuck station 19, wire-guide tooling in accordance with this invention, generally designated 20, is movable to a position adjacent the rear face of the stator 10, and the finish leads 18 are manipulated by a robot end effector 22, only a portion of which is shown in the drawings, to insert or tuck the finish leads 18 between their respective coils 14 and the portion of the stator core 12 adjacent thereto, which are covered by the cell paper 15 as described above.

Figure 2:
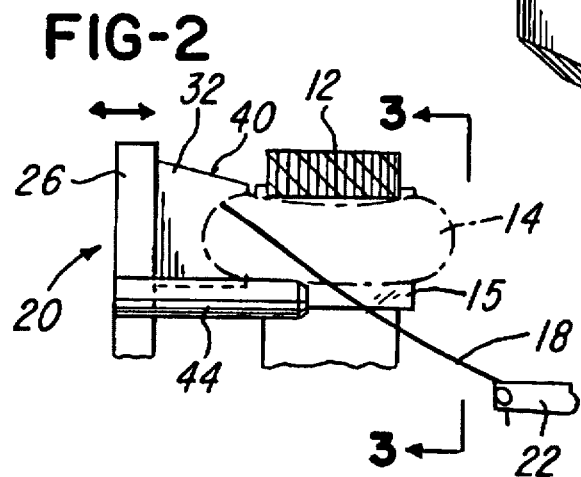
FIG. 2 is a fragmentary, vertical section view of the stator of FIG. 1 also showing a fragment of the wire-guide tooling and a robot end effector of FIG. 1.

With reference to FIGS. 1 and 2, the wire-guide tooling 20 is driven toward and away from the stator core 12 by a commercially-available air actuator or cylinder, shown diagrammatically at 24, which is mounted in fixed relation to the lead tuck station, i.e. the actuator 24 does not rotate with the turret. An upstanding plate 26, which is parallel to the stator end face and forms a part of the wire-guide tooling 20, may be threaded onto the nose of a piston rod 28 driven by the actuator 24 and locks against a jam nut (not shown). The rod 28 is moved relative to the stator core 12 by the actuator 24 along the central, longitudinal axis of the stator 12 located at the lead tuck station 19.

A pair of wire-guiding shoes, namely an upper shoe 32 and a lower shoe 34, are mounted to respectively opposite ends of the plate 26. The shoes 32 and 34 have C-shaped recesses 36 and 38, respectively, which receive the coil end turns of the upper and lower coils 14, respectively, when the wire-guide tooling 20 is moved into position adjacent the stator 10, as shown in FIG. 2. In this respect, the recesses 36 and 38 are so sized that they may receive the end turns of the coils 14 for a variety of wire sizes and a variety of numbers of wire turns per coil. Each of the wire-guiding shoes 32 and 34 may be mounted on the plate 26 by a pair of screws (not shown) that extend through apertures (not shown) in the plate 26 into tapped bores (not shown) in the rear faces of the wire-guiding shoes 32 and 34. Alternatively, the screws may extend though vertically-extending slots in the plate 26 so that the wire-guiding shoes may be readily adjusted vertically.

With particular reference to FIG. 2, the upper wire-guiding shoe 32 has a planar upper surface 40 that slopes downwardly from rear to front at a slight angle, for example 15 degrees. Here, rear to front is taken as left to right, as viewed in FIG. 2. When the wire-guide tooling is advanced toward the stator 10, the sloping upper surface terminates closely adjacent the top of the upper coil 14 near the rear face of the stator core 12 and the cell paper 15, for reason which will be described below. As shown in FIG. 1, the lower wire-guiding shoe 34 similarly has a planar lower surface 42 that slopes upwardly from rear to front and similarly terminates closely adjacent the bottom of the lower coil 14 near the rear face of the stator core 12 and the cell paper 15.

Figure 3:
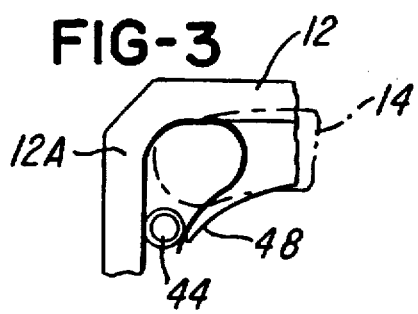
FIG. 3 is a fragmentary end view of the stator and wire-guide tooling of FIG. 2 taken along line 3—3 thereof.

With reference to FIGS. 1 through 3, the wire-guide tooling 20 further includes upper and lower wire-retaining pins 44 and 46, respectively, that project from the plate 26 toward the rear face of the stator 10. The upper and lower wire-retaining pins 44 and 46 are attached to the plate 26 at opposite sides thereof between the upper and lower wire-guiding shoes 32 and 34. The wire-retaining pins 44 and 46 project into the bore of the stator 10 when the wire-guide tooling 20 is advanced toward the stator 10, as shown in FIG. 2. For reasons which will be discussed further below, the upper wire-retaining pin 44, when in the stator bore, occupies the space between the stator frame 12A and the upper pole tip 48 adjacent the upper finish lead 18, as illustrated in FIG. 3. Although not separately illustrated, the lower wire-retaining pin 46 occupies the space between a lower pole tip adjacent the lower finish lead 18 and the stator frame 12A in a manner substantially identical to that shown in FIG. 3.

As is evident from the drawings and the foregoing description, the wire-guide tooling 20 is symmetrical about a horizontal plane extending through the vertical center of the plate 26. Therefore, further discussion of this invention will be limited to the upper half of the wire-guide tooling 20 with respect to the upper coil 14, it being understood that the description of the upper half of the tooling 20 and the upper coil 14 applies equally, but in mirror image, to the lower half of the tooling 20 and the lower coil 14.

With reference to FIGS. 1 and 2, the upper finish lead 18 is tucked between the upper coil 14 and the portion of the stator core 12 adjacent thereto by first advancing the wire-guide tooling 20 toward the rear of the stator 10 to the position illustrated in FIG. 2. At this time, the coil leads are still clamped by the temporary clamps (not shown), and extend as illustrated in FIG. 1. After the wire-guide tooling 20 is moved to its position adjacent the stator 10, the robot end effector 22 is manipulated to grip the upper finish lead 18 intermediate its temporary clamp and the upper coil 14 with a low gripping pressure, which will permit the finish lead 18 to slip somewhat in the end effector 22. The robot may be any suitable, commercially-available industrial robot, but a programmable 3-axis Cartesian robot is presently preferred. After the robot end effector grips the upper finish lead 18, the wire clamp holding the upper finish lead 18 may be opened so that the upper finish lead 18 may be removed therefrom.

With particular reference to FIG. 2, the upper finish lead 18 is then manipulated by the robot end effector so that the finish lead extends from the rear of the coil downwardly through the space between the nearby pole tip 48 and the stator core 12 (see also FIG. 3). The wire-guiding shoe 32 traps the last wound end turn of the upper coil 14 against the upper coil 14 so that it will not drop or otherwise move when the upper finish lead 18 is so extended. As mentioned above, the upper wire-retaining pin 44 is also located between the pole tip 48 and the stator core 12, as shown in FIG. 3. Therefore, the wire-retaining pin 44 serves to prevent the upper finish lead 18 from being drawn downwardly past the pole tip 48 by the robot end effector 22. If the upper finish lead 18 were permitted to move downwardly past the pole tip 48, the need to reform the upper coil 14 by hand arises because the end effector would not be reliably able to manipulate the finish lead 18 into its original position above the pole tip 48. As is evident from FIG. 2, the upper finish lead 18 may engage the wire-retaining pin 44, which stops the downward movement of the upper finish lead 18. After the upper finish lead 18 is extended downwardly from the coil 14, the wire-guide tooling 20 is retracted.

Figure 5:
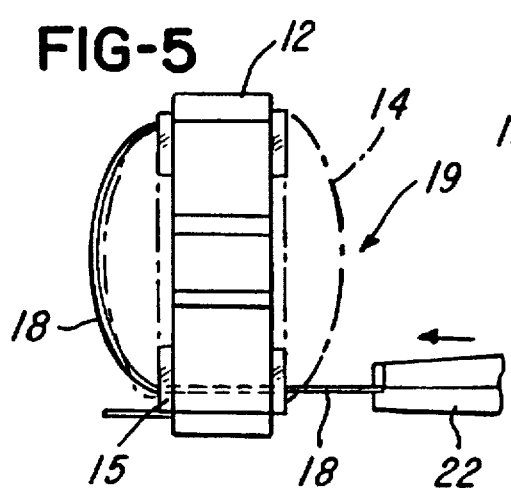
FIG. 5 is a top plan view of the stator shown in FIG. 4 at the same stage in the manufacturing process as shown in FIG. 4.

With reference to FIGS. 4 and 5, the upper finish lead 18 is then gripped with a high gripping pressure and manipulated by the robot end effector 22 to form an upwardly extending slack wire segment or loop L in the last wound coil end turn of the upper coil 14 at the rear of the stator 10. This loop L is created by moving the end effector inwardly and upwardly towards the stator 10, which pushes the finish lead 18 inwardly and causes the last wound coil end turn of the upper coil 14 to move outwardly away from the coil, as illustrated in FIGS. 4 and 5.

Figure 6:
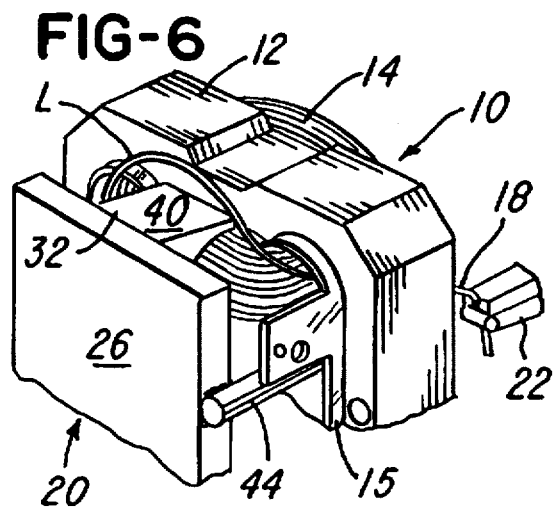
FIG. 6 is a fragmentary, rear perspective view, looking in a direction opposite from FIG. 1, showing yet a later stage in the manufacturing process.

With reference to FIG. 6, the wire-guide tooling is thereafter advanced toward the stator 10. Because the loop L extends above the upper coil 14, the upper surface 40 of the upper wire-guiding shoe 32 is located between the top of the coil 14 and the loop L. Referring to FIG. 7, the robot end effector 22 is then moved away from the stator 10 to remove the loop L. As the slack is removed from the wire, the last wound end turn is pulled into engagement with the upper surface 40 of the upper wire-guiding shoe 32. Because the upper surface 40 of the upper wire-guiding shoe 32 slopes downwardly towards the stator core 12, the last wound coil end turn is cammed thereby to a position atop the upper coil 14 near the stator core 12 and preferably against the cell paper 15. More importantly, the finish lead 18 is likely pulled or tucked between the rear finish side corner of the upper coil 14 and the cell paper 15 adjacent thereto, as shown in FIG. 7. Although such tucking of the finish lead 18 at the rear of the coil 14 is desirable, it does not result in all cases and is not critical. In this respect, it is also possible that the movement of the end effector 22 will cause the last wound end turn of the upper coil 14 to be tucked between the rear, start side corner of the upper coil 14 and the cell paper 15 adjacent thereto, as also shown in FIG. 7

After the finish wire 18 is pulled taut as shown in FIG. 7, the robot end effector 22 is moved to tuck the finish lead 18 between the front, finish side corner of the upper coil 14 and the cell paper 15 covering the portion of the stator core adjacent thereto. The end effector 22 is first moved from the position to reposition the finish lead 18 from the position thereof shown in FIG. 7 to that indicated by dotted line 18A in FIG. 9, wherein it extends substantially vertically closely adjacent the front face of the stator 10. As shown in FIG. 8, the end effector 22 is then moved laterally to draw the upper finish lead 18 across the top front of the upper coil 14. The force applied to the upper finish lead 18 by movements of the end effector is sufficient to ensure that the lead 18 is drawn or tucked into a position between the front, finish side corner of the coil 14 and the cell paper 15 covering the portion of the stator core 12 adjacent thereto, as shown in FIGS. 9 and 10. The upper finish lead 18 is retained between the coil 14 and the stator core 12 covered by the cell paper 15 due to the frictional engagement of the finish lead 18 with the coil 14 and the cell paper 15.

Once the upper finish lead 18 is so tucked, it is released by the robot end effector, and similar operations are performed with respect to the lower finish lead 18 to tuck the lower finish lead 18 between the lower coil 14 and the cell paper 15 covering the inwardly-facing surfaces of the stator core 12 adjacent thereto. As will be evident to one skilled in the art, these operations may be mirror images of the operations described above with regard to the upper finish lead 18.

When both the upper and lower finish leads 18 have been tucked in accordance with this invention, the other coil leads may be removed from their respective temporary wire clamps by the end effector 22. At this time, the wound stator 10 is ready to be removed from its clamp mechanism (not shown) and replaced with a fresh, unwound stator core 12. Because the finish leads 18 have been tucked, as described above, and the start leads or any tap leads have been wound into the coils the stator 10 may be removed by an automated load/unload mechanism without the likelihood of the coils despooling.

With reference to FIG. 11, an alternative embodiment of the wire-guiding tooling 20 is illustrated therein and generally designated 120. The wire-guide tooling 120 may be identical to the wire-guide tooling 20, except that the wire-retaining pins 144 and 146 thereof are detachable from the plate 26 thereof. The pins 144 and 146 have reduced diameter sections that extend through apertures 150 and 152, respectively, in the plate 126. Shoulders 144A and 146A on the upper and lower wire-retaining pins 144 and 146, respectively, engage the forwardly facing surface of the plate 126. The wire-retaining pins 144 and 146 are secured to the plate by bolts (not shown) that extend through transverse bores 154 and 156 in the pins 144 and 146, respectively.

In still a further, unillustrated embodiment, a forwardly projecting button (not shown) may be mounted on the plate 26 or 126 of the wire-guide tooling 20 or 120 to engage the stator core 12 to cause the tooling 20 or 120 to stall at a predetermined distance from the stator core 12. The same result could be obtained by precise control of the actuator 24.

Although the presently preferred embodiment of this invention has been described, it will be understood that within the purview of the invention various changes may be made within the scope of the following claims.

Having thus described our invention, we claim:

1. In an apparatus for manufacturing an electric motor stator comprising a winding machine for winding field coils formed from magnet wire onto a stator core, each of said coils having a finish wire, the improvement comprising:

wire-guide tooling movable to a position adjacent said stator, said wire-guide tooling have a wire-guiding surface which, when in said position adjacent said stator, guides wire drawn thereacross to extend across a coil outwardly thereof and adjacent the stator core;

means for manipulating said finish lead so that the last wound coil end turn of said coil is drawn across said wire-guiding surfaces of said wire-guide tooling; and wherein said manipulation means further manipulates said finish lead to insert said finish lead between a portion of said coil and a portion of said stator core adjacent said coil.

2. The improvement of claim 1 wherein said wire-guide tooling comprises a wire-guiding shoe on which said wire-guiding surface is formed, said wire-guiding shoe having a recess formed therein that receives end turns of said coil when said tooling is adjacent said stator core.

3. The improvement of claim 1 wherein said wire-guide tooling comprises a wire-retaining pin that is located within the bore of said stator when said tooling is adjacent said stator core, said wire-retaining finger interfering with some movements of said finish lead by said manipulating means, thereby preventing said manipulating means from causing said coil to despool.

4. In a method for manufacturing electric motor stators comprising winding a plurality of field coils onto a stator core, each of said coils have a coil finish lead, the improvement comprising:

manipulating a finish lead to provide a slack wire condition in the last wound coil end turn of a coil;

positioning wire-guide tooling adjacent said stator so that a wire-guiding surface on said tooling is intermediate said last wound coil end turn and the remainder of said coil, said wire-guiding surface terminating outwardly of said coil near said stator core;

removing said slack wire condition by drawing said last wound end turn against said wire-guiding surface to thereby position said end turn outwardly of said coil and near said stator core; and thereafter manipulating said finish lead to insert said finish lead between said coil and a portion of said stator core adjacent thereto, whereby said finish lead is frictionally retained by said coil and said portion of said stator core.

5. An apparatus for manufacturing an electric motor stator having a stator core, comprising:

a winding station at which coils of wire are wound onto said stator core and start and finish leads extending from said coils are inserted into temporary wire clamps that travel with said stator core; and a lead tucking station including wire-guide tooling movable to a position adjacent said stator and having wire-guiding surfaces which, when in said position adjacent said stator, guide wires drawn thereacross to extend across a coil outwardly thereof and adjacent the stator core, and means for manipulating said finish leads to tuck the finish leads of each stator coil between their respective stator coils and a portion of the stator core adjacent thereto.

6. A method for manufacturing electric motor stators, said stators each having a stator core, comprising:

locating a stator core at a winding station;

winding coils of magnet wire onto said core at said winding station, each of said coils having start and finish leads that are placed in temporary wire clamps at said winding station;

transferring said stator core and said temporary wire clamps to a lead tuck station; and while said stator is at said lead tuck station, manipulating each of said finish wires so that they are inserted between their respective coils and a portion of the stator core adjacent thereto.

7. The method of claim 6 wherein said manipulating step comprises gripping said finish leads and drawing them across surfaces of wire guide tooling moved into position adjacent said stator core.

* * * * *